(12) United States Patent
Athari et al.

(10) Patent No.: US 11,536,022 B2
(45) Date of Patent: Dec. 27, 2022

(54) BUILDING BOARD WITH ACOUSTICAL FOAM

(71) Applicant: CertainTeed Gypsum, Inc., Malvern, PA (US)

(72) Inventors: Christopher K. Athari, St. Petersburg, FL (US); Thomas J. Garvey, Oakville (CA); Pamela Shinkoda, Oakville (CA)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

(21) Appl. No.: 16/984,716

(22) Filed: Aug. 4, 2020

(65) Prior Publication Data

US 2020/0362555 A1 Nov. 19, 2020

Related U.S. Application Data

(63) Continuation of application No. 16/031,444, filed on Jul. 10, 2018, now Pat. No. 10,731,337, which is a
(Continued)

(51) Int. Cl.
*E04B 1/86* (2006.01)
*B32B 13/14* (2006.01)
(Continued)

(52) U.S. Cl.
CPC ............... *E04B 1/86* (2013.01); *B32B 3/266* (2013.01); *B32B 5/022* (2013.01); *B32B 13/045* (2013.01);
(Continued)

(58) Field of Classification Search
CPC .......................................................... E04B 1/86
See application file for complete search history.

(56) References Cited

U.S. PATENT DOCUMENTS 2,806,811 A 9/1957 Von Hazmburg
4,265,979 A 5/1981 Baehr
(Continued)

FOREIGN PATENT DOCUMENTS

DE 4446968 6/1995
EP 0282337 9/1988
(Continued)

OTHER PUBLICATIONS

Sheet, Merriam-Webster, retrieved May 16, 2016.
(Continued)

*Primary Examiner* — Daniel H Lee
(74) *Attorney, Agent, or Firm* — McDonnell Boehnen Hulbert & Berghoff LLP

(57) ABSTRACT

Disclosed is a building board construction that provides enhanced acoustical properties. In one possible embodiment, the board is a gypsum board with opposing facing sheets and an intermediate set gypsum core. An opened celled polymeric sheet is formed within the gypsum core and gives the resulting board enhanced sound absorption. In an alternative embodiment, individual pieces of polymeric foam are used in stead of the polymeric sheet. Also disclosed are various manufacturing methods whereby boards with enhanced acoustical properties can be formed in an continuous process. The various components of the present disclosure, and the manner in which they interrelate, are described in greater detail hereinafter.

15 Claims, 4 Drawing Sheets

Related U.S. Application Data continuation of application No. 13/837,109, filed on Mar. 15, 2013, now abandoned.

(51) Int. Cl.
  *B32B 5/02*      (2006.01)
  *B32B 13/04*     (2006.01)
  *B32B 13/08*     (2006.01)
  *B32B 3/26*      (2006.01)
  *E04B 1/84*      (2006.01)

(52) U.S. Cl.
  CPC ............. *B32B 13/08* (2013.01); *B32B 13/14* (2013.01); *B32B 2262/10* (2013.01); *B32B 2266/0285* (2013.01); *B32B 2266/06* (2013.01); *B32B 2307/102* (2013.01); *B32B 2419/00* (2013.01); *E04B 2001/8461* (2013.01); *Y10T 442/25* (2015.04)

(56) References Cited

U.S. PATENT DOCUMENTS

| | | | |
|---|---|---|---|
| 4,378,405 A | | 3/1983 | Pilgrim |
| 4,390,642 A | | 6/1983 | Smith |
| 5,060,291 A | | 10/1991 | Albertelli |
| 5,104,715 A | * | 4/1992 | Cruz ................ E04C 2/205 156/250 |
| 6,488,792 B2 | | 12/2002 | Mathieu |
| 6,941,720 B2 | | 9/2005 | DeFord |
| 7,049,251 B2 | | 5/2006 | Porter |
| 7,686,902 B2 | | 3/2010 | Kimura |
| 2005/0176833 A1 | | 8/2005 | Tay |
| 2010/0055431 A1 | * | 3/2010 | College ............ B29D 99/0021 428/218 |
| 2010/0143682 A1 | | 6/2010 | Shake |
| 2010/0273907 A1 | | 10/2010 | Frenzel |
| 2010/0331434 A1 | | 12/2010 | sHin |
| 2011/0297310 A1 | | 12/2011 | Hauber |

FOREIGN PATENT DOCUMENTS

| | | | |
|---|---|---|---|
| EP | 0965701 | | 12/1999 |
| JP | S5251719 A | | 4/1977 |
| JP | S5355329 A | | 5/1978 |
| JP | 2005186410 A | | 7/2005 |
| KR | 2003368809 Y1 | | 12/2003 |
| KR | 20080027177 A | * | 3/2008 |
| KR | 20080027177 A | | 3/2008 |
| KR | 100874212 B1 | | 12/2008 |
| WO | 2000024595 | | 8/1999 |
| WO | 02/098646 | | 12/2002 |

OTHER PUBLICATIONS

Planar, Definition of, Merriam-Webster, http://www.merriam-webster.com/dictionary/planar, retrieved Nov. 17, 2016.

* cited by examiner

BUILDING BOARD WITH ACOUSTICAL FOAM

CROSS-REFERENCE TO RELATED APPLICATIONS

This application is a continuation of U.S. patent application Ser. No. 16/031,444, filed Jul. 10, 2018, now U.S. Pat. No. 10,731,337, which is, continuation of U.S. patent Ser. No. 13/837,109, filed Mar. 15, 2013, each of which is hereby incorporated herein by reference in its entirety.

TECHNICAL FIELD

This disclosure relates to a building board construction. More specifically, the present invention relates to a building board with an acoustical foam.

BACKGROUND OF THE INVENTION

Building board, also known as wallboard, plasterboard, or drywall, is one of the most commonly used building components in the world today. Building board is frequently used within the interior of a dwelling, where it functions both as a finished wall covering and as a structural room partition. Building board can also be used on the exterior of a dwelling, where it serves as a sheathing to provide weather protection and insulation. Building board can also be used as an interior facing for other structures as well, such as stairwells, elevator shafts, and interior ducting.

One particularly popular form of building board is known as gypsum board. Gypsum board is constructed by depositing a layer of cementitious gypsum slurry between two opposing paper liners. Gypsum slurry is the semi-hydrous form of calcium sulfate and has many physical characteristics that make it suitable for use as a building component. For example, gypsum boards generally have a smooth external surface, a consistent thickness, and allow for the application of finishing enhancements, such as paint. Gypsum board is also desirable because it provides a degree of fire resistance and sound abatement.

An example of a paper-covered gypsum board is disclosed in U.S. Pat. No. 2,806,811 to Von Hazmburg. Von Hazmburg discloses a board that primarily consists of a thick gypsum core that is encased in a fibrous envelope consisting of both a manila sheet and a newsprint sheet. These sheet layers can be made from a conventional multi-cylinder paper making process.

Another popular form of building board is known as glass reinforced gypsum (GRG) board. An example of one such board is disclosed in U.S. Pat. No. 4,265,979 to Baehr et. al. Baehr discloses a building board constructed from opposing glass fiber mats with an intermediate gypsum core. This construction provides a hardened external surface and is an improvement over earlier paper faced boards.

Yet another type of gypsum board is disclosed in commonly owned U.S. Pat. No. 4,378,405 to Pilgrim. Pilgrim discloses a GRG board that is faced on one or both sides with a porous, nonwoven glass mat. The glass mat of Pilgrim is fully embedded into the slurry core. This is accomplished by vibrating the gypsum slurry to cause it to pass through the porous openings in the mat. Embedding the mat within the core as taught in Pilgrim results in a thin film of slurry being formed on the outer surface of the board. Building boards with this construction are referred to as embedded glass reinforced gypsum (EGRG) boards.

These various building board constructions offer many beneficial characteristics. However, none of these constructions provide for increased acoustical properties. As a result, these boards offer little, if any sound absorption or insulation, they act as a sound barrier. Sound absorption and insulation are especially important when the building board is used as a room partition or even as an exterior building component. Thus, there exists a need in the art for building boards with increased acoustical properties. More specifically, there is a need in the art for a board that absorbs sound waves. The present invention is aimed at achieving these and other objectives.

SUMMARY OF THE INVENTION

The building boards of the present disclosure have several important advantages. In particular, the disclosed building boards provide increase sound absorption without sacrificing any structural characteristics of the board.

A further advantage is realized by providing increased acoustical properties via the inclusion of a polymer sheet within the core of the building board.

Still yet another possible advantage of the present system is achieved by incorporating a polymer sheet via a continuous manufacturing method, thereby enabling the building board of the present disclosure to be manufactured quickly and inexpensively.

Another advantage of the present system is attained by including a series of sound absorbing polymeric cubes within the core of the building board.

Still yet another possible advantage of the present system is achieved by incorporating polymeric cubes or as a powdered material via a continuous manufacturing method, thereby enabling the building board of the present disclosure to be manufactured quickly and inexpensively.

A further advantage is recognized by incorporating sound absorbing materials into a gypsum building board via a continuous manufacturing method.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

The present disclosure relates to a building board with enhanced acoustical properties. In one possible embodiment, the board is a gypsum board with opposing facing sheets and an intermediate set gypsum core. An opened celled polymeric sheet is formed within the gypsum core and gives the resulting board enhanced sound absorption. In an alternative embodiment, individual pieces of polymeric foam are used instead of the polymeric sheet. Also disclosed are various manufacturing methods whereby boards with enhanced acoustical properties can be formed in a continuous process. The various components of the present disclosure, and the manner in which they interrelate, are described in greater detail hereinafter.

Figure 1:
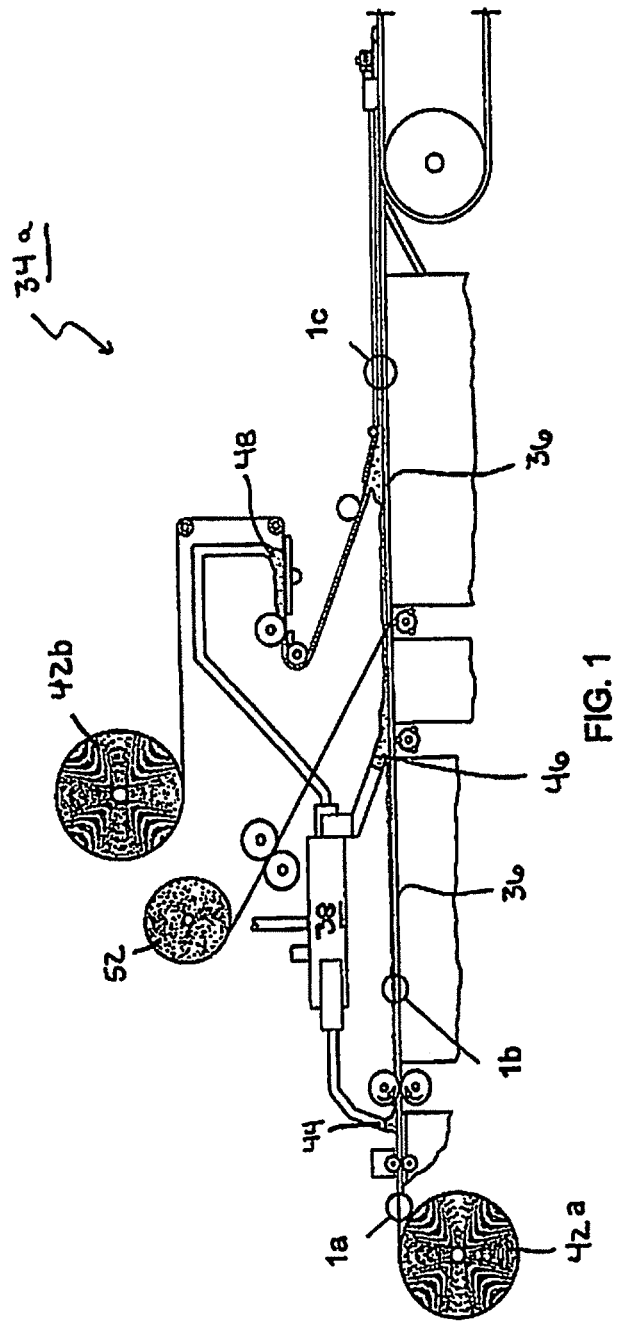
FIG. 1 is a diagram of one possible manufacturing process for the building boards of the present disclosure.
Figure 2:
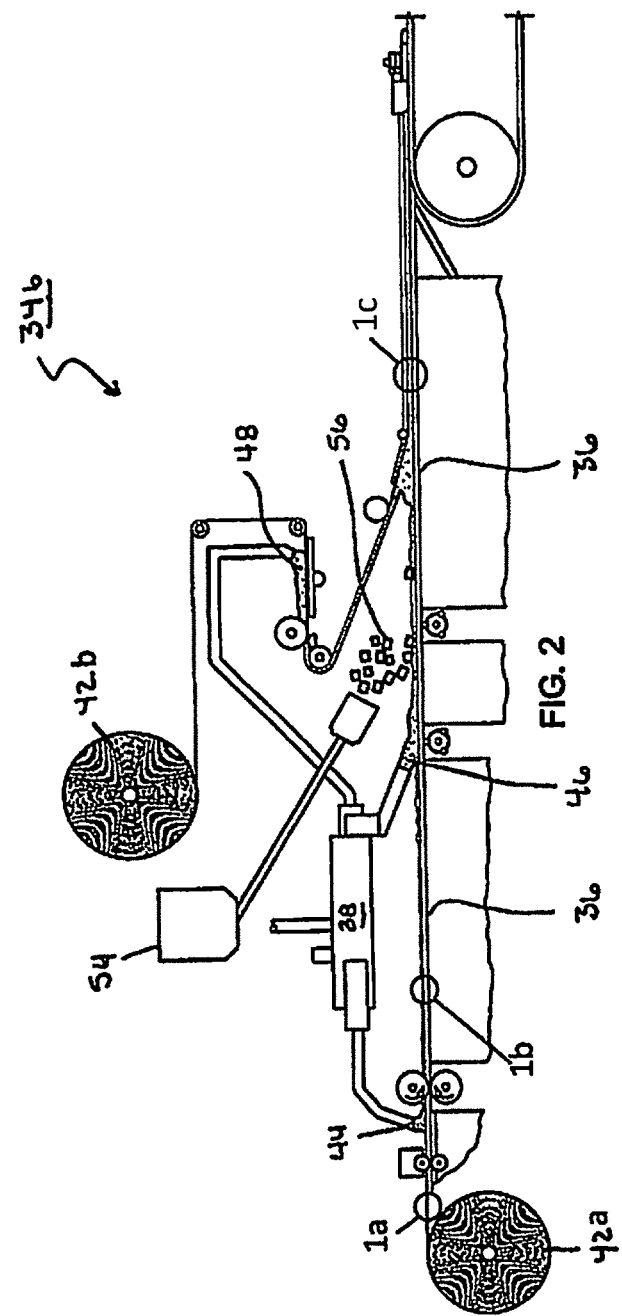
FIG. 2 is a diagram of another possible manufacturing process for the building boards of the present disclosure.
Figure 3:
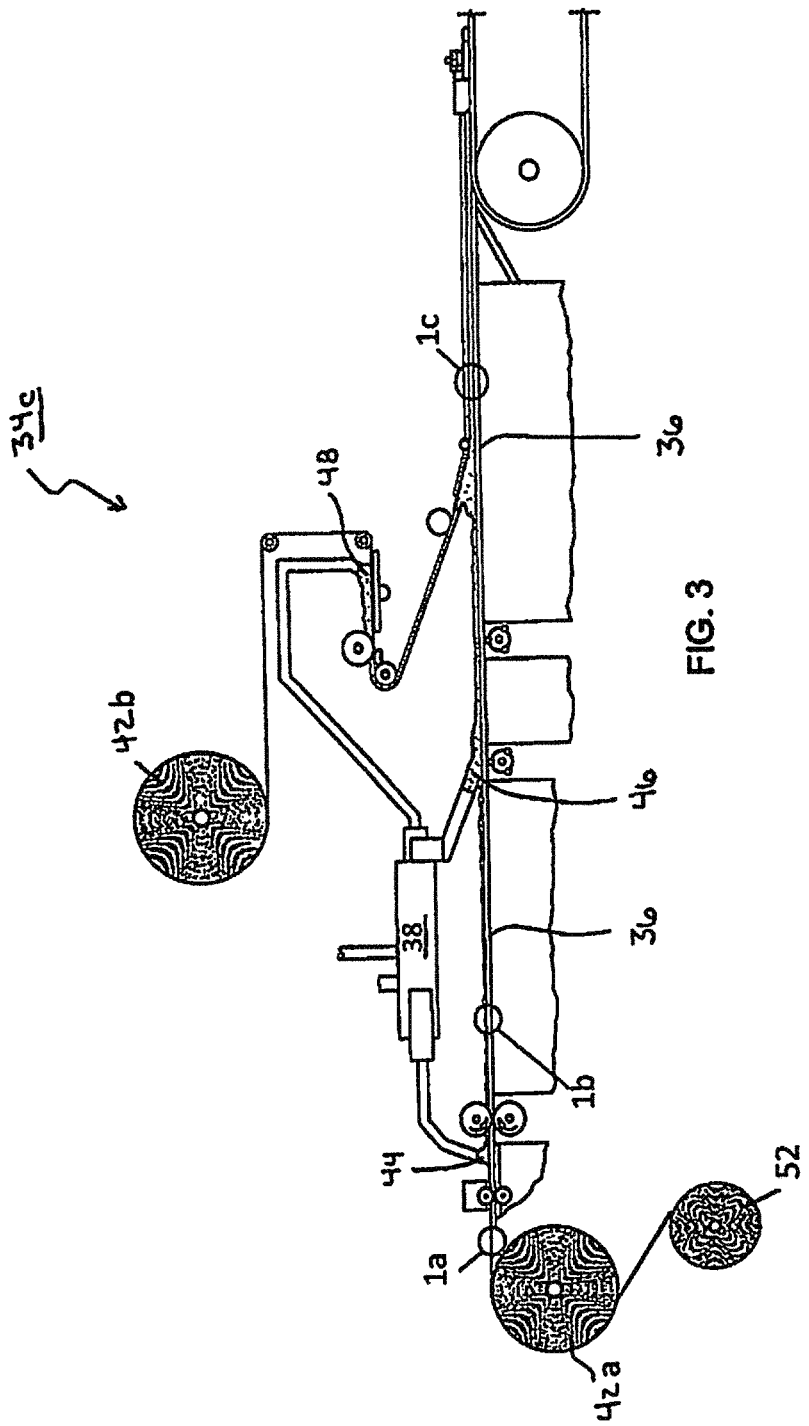
FIG. 3 is a diagram of another possible manufacturing process for the building boards of the present disclosure.
Figure 4:
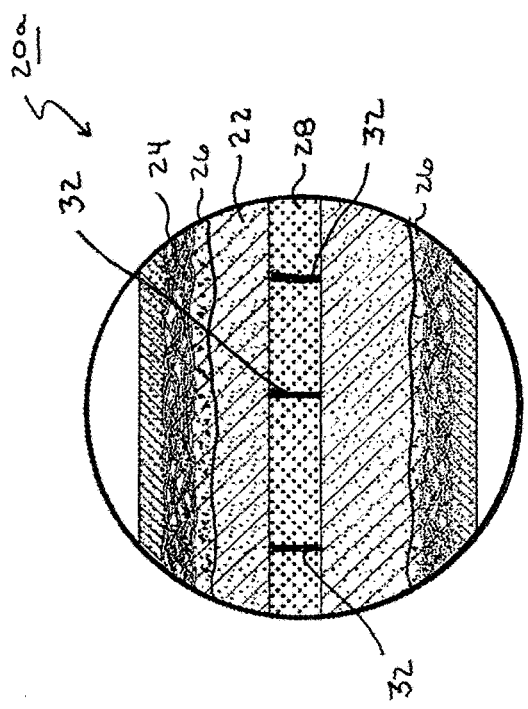
FIG. 4 is a cross sectional view of an embodiment of the building board of the present disclosure.
Figure 5:
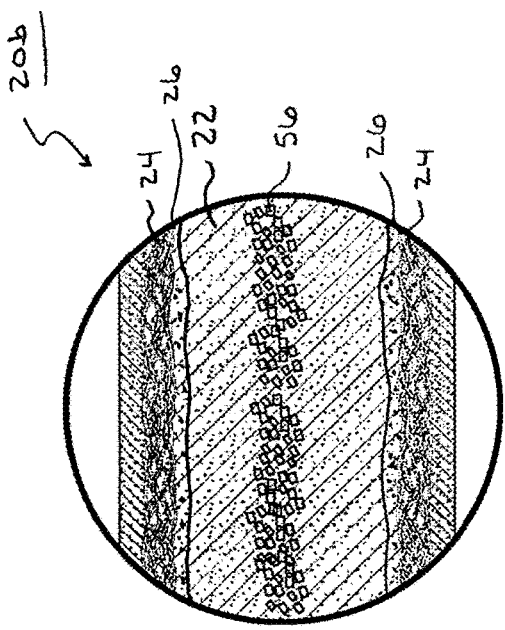
FIG. 5 is a cross sectional view of an alternative embodiment of the building board of the present disclosure.
Figure 6:
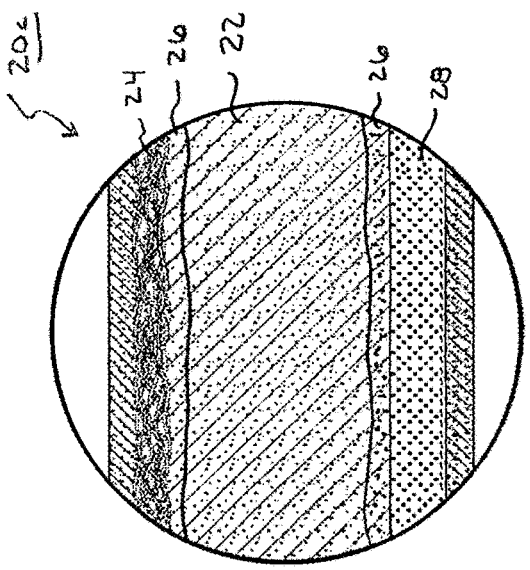
FIG. 6 is a cross sectional view of an alternative embodiment of the building board of the present disclosure.

FIGS. 1-3 illustrate various production lines (34a, 34b, and 34c) for constructing the building boards of the present disclosure. FIGS. 4-6 are cross sectional views of various board constructions (20a, 20b, 20c) of the present disclosure. The boards of the present disclosure are generally a core layer 22 of a set gypsum core and opposing paper of fibrous sheets 24. In the particular embodiment illustrated in FIG. 4, board 20a has upper and lower mats 24 which are formed from a series of non-woven, randomly aligned inorganic fibers. These mats are preferably porous with interior and exterior faces. Paper facing sheets can also be used and are likewise represented by element 24.

With continuing reference to FIG. 4, upper and lower mats 24 are each coated with a layer of dense set slurry 26. Dense slurry 26 preferably penetrates the upper and lower mats 24. As a result the exterior surface of each mat 24 is substantially covered by set slurry. Core layer 22 of set gypsum extends fully between and bonds with the upper and lower dense slurry layers 26. In one embodiment, core slurry layer 22 has a density that is less than the density of the upper and lower dense slurry layers 26.

The enhanced acoustical properties are achieved via the inclusion of a polymer sheet 28 into core slurry layer 22. In the preferred embodiment, sheet 28 is formed from a melamine resin and is formed into an opened cell foam. Melamine resin is a thermoset polymer. A suitable foam is Basotect® which is manufactured and sold by BASF Corporation. Basotect® foam preferred because it provides a three-dimensional network of slender and easily shaped webs. Basotect® foam also gives the resulting board sound absorption, and chemical and fire resistance. However, the use of other polymer foams is also within the scope of the present disclosures. For a ½ inch thick building board, a polymer sheet 28 of ⅛ inch is preferred.

Sound waves entering the cells of the foam are subsequently attenuated and dissipated, thereby giving sheet 28 its sound absorbing characteristics. As such, it is important that the cells of the foam remain free to gypsum slurry during the formation of the board. Polymer sheet 28 is design to be positioned within, but not penetrated by, the core slurry layer 22. Because polymer sheet 28 does not absorb the slurry layer 22, and because it preferably extends over the majority of the width of board 20a, a series of apertures 32 must be formed through the thickness of sheet 28. Apertures 32 permit the slurry 22 to extend through sheet 28 to thereby fully integrate building panel 20a. In the absence of apertures 32, building panel 20a would be prone to separation along the boundary of sheet 28. In the event that polymer sheet 28 could absorb slurry layer 22, apertures could be eliminated 32. In the preferred embodiment, the thickness of core layer 22 is substantially larger than the thickness of polymer sheet 28.

FIG. 1 illustrates a gypsum board production line 34a that has been modified in accordance with the present disclosure. Production lines 34a includes a series of forming tables 36 for supporting building panel 20a during its formation. As is known in the art, the mats that form panel are under tension by way of a series of downstream belts. Once panel has been formed, it is passed to a series of board dryers. Dryers function in driving out excess moisture and causing the gypsum slurry to set. This results in the formation of a dried composite panel.

As further noted in FIG. 1, gypsum board 20a is formed from first and second fibrous mats 24 which a volume of gypsum slurry being deposited from a mixer 38. Paper mats can alternatively be used in place of fibrous mats. In either event, mats 24 are initially stored in large rolls 42 that are unwound in a continuous manufacturing method. A first large roll 42a is unwound onto forming table at location 1a. A dense slurry layer 26 can optionally be deposited over the first mat 24 after it is unrolled beneath a first mixer outlet 44. Rollers push the dense slurry layer through the mat at location 1b. Additional slurry is thereafter dispensed from mixer 38 at a second mixer outlet 46 to form core slurry layer 22. A second large roll 42b is ideally positioned downstream of first roll. A second mat 24 is unwound from this roll over top of the deposited gypsum core 22 to create sandwich or panel. The formed panel is noted at location 1c. Mixer 38 includes a third outlet 48 for supplying a dense slurry layer 26 over the second mat 24. The polymer sheet 28 is initially stored in a wound roll 52 and is dispensed immediately downstream of second mixer outlet 46. This positions sheet 28 in approximately the center of core 22.

An alternative production line 34b is disclosed in FIG. 2. Line 34b is the same in all respects to the production line of FIG. 1; however, the rolled polymer sheet 28 is replaced by a hopper 54 containing a plurality of polymer cubes 56 or a volume of a granulated polymer. In the preferred embodiment, cubes of approximately ½ inch are employed. Other shapes and sizes can also be used instead of ½ inch cubes. Basotect® foam can be used to produce polymer cubes 56. Cubes 56 are dispensed from a hopper 54 to a chute to deliver cubes 56 into core slurry layer 22. In still yet additional embodiments, the Basotect® foam is added to the slurry in a grated or granular form.

The resulting building board 20b has a cross section as illustrated in FIG. 5. Each of the polymer cubes 56 or granulated material includes an opened cell foam. Cubes 56 or granules are randomly distributed within slurry layer 22; however, slurry 22 does not penetrate the individual pieces or cubes 56. The composite board 20b is fully integrated as core layer 22 extends about the individual polymer cubes 56. In still yet another embodiment, the polymer foam can be grated to form very small bits of foam that agglomerate into a foam fluff. This foam fluff can then be distributed into slurry core 22.

A further embodiment of the production line 34c is depicted in FIG. 3. This embodiment uses a polymeric sheet 28, which may have the same construction as the sheet described in connection with FIG. 1. However, instead of sheet 28 being delivered into slurry core 22, it is secured to the lower mat 24 via an adhesive. More specifically, a roll 52 of the polymeric sheet is dispensed over top of mat 24 prior to the mat being delivered to the forming table 36. The cross sectional view of the resulting building board 20c is depicted in FIG. 6. As illustrated, sheet 28 is now oriented in facing relation with the first mat 24. It is also within the scope of the present invention to apply sheet 28 directly to one of the upper or lower dense slurry layers. This would avoid sheet 28 being secured to mat 24. Either of these embodiments may be used in connection with either of the previously described embodiments.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A building panel comprising:
opposed upper and lower mats, the opposed upper and lower mats having interior and exterior faces;
a core layer of set gypsum having a thickness disposed between the interior faces of the upper and lower mats; and
a plurality of polymer pieces, the polymer pieces distributed within the core slurry layer, each polymer piece containing a plurality of opened cells, the core layer extending around but not penetrating the polymer pieces,
wherein the plurality of polymer pieces is provided as a plurality of polymer cubes, a granulated polymer, a powdered polymer, or a grated polymer.

2. The building panel of claim 1, further comprising:
an upper layer of set gypsum coating the interior face of the upper mat and disposed between the core layer of set gypsum and the upper mat, the core layer of set gypsum having a density that is less than a density of the upper layer of set gypsum; and
a lower layer of set gypsum coating the interior face of the lower mat and disposed between the core layer of set gypsum and the lower mat, the core layer of set gypsum having a density that is less than a density of the lower layer of set gypsum.

3. The building panel of claim 2, wherein the upper and lower mats are porous mats formed from non-woven, randomly aligned inorganic fibers.

4. The building panel of claim 3, wherein the upper layer of set gypsum penetrates the upper mat, such that the exterior surface of the upper mat is substantially covered by the upper layer of set gypsum, and wherein the lower layer of set gypsum penetrates the lower mat, such that the exterior surface of the lower mat is substantially covered by the lower layer of set gypsum.

5. The building panel of claim 4, wherein the set gypsum of the core layer extends continuously from the upper mat to the lower mat.

6. The building panel of claim 1, wherein the upper and lower mats are paper mats.

7. The building panel of claim 1, wherein the polymer pieces are formed from a melamine resin.

8. The building panel of claim 1, wherein the opened cells of the polymer pieces enhance sound-absorbing characteristics of the building panel.

9. The building panel of claim 1, wherein the plurality of polymer pieces are centrally disposed in the core layer, such that the core layer includes a zone extending adjacent the upper mat that is free of polymer pieces and a zone extending adjacent the lower mat that is free of polymer pieces.

10. The building panel of claim 1, wherein the plurality of polymer pieces comprise at least ten polymer pieces.

11. The building panel of claim 10, wherein the plurality of polymer pieces comprise at least twenty polymer pieces.

12. The building panel of claim 11, wherein the plurality of polymer pieces comprise at least fifty polymer pieces.

13. The building panel of claim 12, wherein the plurality of polymer pieces comprise at least 100 polymer pieces.

14. The building panel of claim 13, wherein the plurality of polymer pieces are in the form of a granulated material.

15. A method for making the building panel of claim 1, the method comprising
on an interior face of a lower mat, separately dispensing a core slurry and the plurality of individual polymer pieces in order to form a core slurry layer having the plurality of individual polymer pieces disposed therewithin, the core slurry layer extending around the polymer pieces;
disposing an upper mat on the core slurry layer, with an interior face of the upper mat facing the core slurry layer; and
causing the core slurry layer to set to provide the core layer of set gypsum having the polymer pieces distributed therein.

* * * * *